(12) United States Patent
Arase et al.

(10) Patent No.: US 7,378,458 B2
(45) Date of Patent: May 27, 2008

(54) METHOD FOR PREPARING INK, INK CARTRIDGE AND INK-JET RECORDING APPARATUS

(75) Inventors: Hidekazu Arase, Hyogo (JP); Mamoru Soga, Osaka (JP); Masaichiro Tatekawa, Osaka (JP); Shigeru Kusakata, Shizuoka (JP); Tsutomu Matsuda, Tokyo (JP); Masashi Itoh, Shizuoka (JP)

(73) Assignees: Matsushita Electric Industrial Co., Ltd., Osaka (JP); Ricoh Company, Ltd., Tokyo (JP)

( * ) Notice: Subject to any disclaimer, the term of this patent is extended or adjusted under 35 U.S.C. 154(b) by 501 days.

(21) Appl. No.: 10/816,003

(22) Filed: Apr. 1, 2004

(65) Prior Publication Data

US 2004/0198867 A1    Oct. 7, 2004

(30) Foreign Application Priority Data

Apr. 4, 2003    (JP)    ............................. 2003-101239

(51) Int. Cl.
    C08J 3/00     (2006.01)
    C08K 3/20     (2006.01)
    C08L 83/00    (2006.01)
    C09D 5/00     (2006.01)
    C09D 11/00    (2006.01)

(52) U.S. Cl. ................ 523/160; 106/31.27; 106/31.28; 523/161; 524/261; 524/262; 524/588; 528/38

(58) Field of Classification Search ................ 523/160, 523/161; 106/31.27, 21.28; 524/262, 261, 524/588; 528/38
See application file for complete search history.

(56) References Cited

U.S. PATENT DOCUMENTS 5,298,220 A * 3/1994 Shimizu et al. ................ 422/1
5,985,015 A * 11/1999 Kanaya ...................... 106/31.6
6,929,686 B2 * 8/2005 Soga et al. .............. 106/31.27
6,942,329 B2 * 9/2005 Soga et al. ................. 347/100
2003/0221586 A1 * 12/2003 Arase et al. ............. 106/31.27

FOREIGN PATENT DOCUMENTS

| JP | 10-212439 | 8/1998 |
|---|---|---|
| JP | 11-293167 A | 10/1999 |
| JP | 11-315231 | 11/1999 |
| JP | 2002-265829 | 9/2002 |
| JP | 2003-026976 | 1/2003 |
| JP | 2003-246948 | 9/2003 |
| WO | WO 02/072719 A1 * | 9/2002 |

* cited by examiner

*Primary Examiner*—Patrick Niland
(74) *Attorney, Agent, or Firm*—Harness, Dickey & Pierce, P.L.C.

(57) ABSTRACT

The invention provides a method for preparing an ink having constituents of a water-soluble dye having a water-soluble solubilizing group of at least one of a sulfonic group and a carboxyl group, water, a water-soluble substance that is condensation-polymerized in the absence of the water, a water-soluble medium and an additive including at least one of an organic acid salt and an inorganic acid salt. This method includes a first mixing step of mixing at least the dye and the water-soluble substance out of the constituents of the ink excluding the additive; a second mixing step of mixing a mixture obtained in the first mixing step and the additive; and a pH adjusting step, performed before the second mixing step, of preparing a solution including the mixture or a solution including the additive while adjusting the solution to a given pH range by using a pH adjuster.

10 Claims, 3 Drawing Sheets

METHOD FOR PREPARING INK, INK CARTRIDGE AND INK-JET RECORDING APPARATUS

BACKGROUND OF THE INVENTION

The present invention relates to a method for preparing an ink for use in, for example, ink-jet recording, an ink cartridge filled with the ink, and an ink-jet recording apparatus using the ink as a recording ink.

An ink including a coloring material (such as a dye or a pigment), a humectant and water is conventionally known as an ink for use in the ink-jet recording. When an image is formed on a recording medium such as recording paper by using the ink including the coloring material, however, the water resisting property of the image is disadvantageously low, namely, if the image gets wet with water, the coloring material oozes out into the water. In particular, when the image is recorded on ordinary paper (i.e., commercially available paper occasionally used in an electrophotographic copying machine that does not have a structure, a composition and characteristics optimum for the ink-jet recording), the water resisting property of the image is very poor.

Therefore, as described in, for example, Japanese Laid-Open Patent Publication Nos. 10-212439, 11-293167 and 11-315231, a hydrolytic silane compound (an organic silicon compound) is conventionally included in the ink so as to improve the water resisting property of an image formed on a recording medium. In the case where the silane compound is thus included in the ink, when ink drops are adhered onto a recording medium and a moisture content (solvent) is evaporated or permeated into the recording medium, a condensation polymerization reaction is caused in the silane compound remaining on the recording medium, so that the condensation-polymerized silane compound can surround the coloring material. As a result, even when an image formed on the recording medium gets wet with water, the coloring material can be prevented from oozing out into the water.

However, in such a water resistant ink including the hydrolytic silane compound, and particularly when the ink includes a water-soluble dye having a water-soluble solubilizing group of at least one of a sulfonic group and a carboxyl group, agglomeration refractory or insoluble in water may be produced through interaction between the dye and the silane compound during the preparation of the ink. Therefore, it is necessary to remove the agglomeration, which largely lowers the production efficiency of the ink. Furthermore, the agglomeration refractory or insoluble in water may be similarly produced also during storage of the ink. Therefore, the agglomeration may be produced, for example, on an ink jetting nozzle of an ink-jet head loaded with a cartridge filled with the ink, which can cause an ink-jet failure.

SUMMARY OF THE INVENTION

The present invention was devised in consideration of the aforementioned conventional problem, and an object of the invention is improving the production efficiency of an ink including a water-soluble substance that is condensation-polymerized in the absence of water, such as the aforementioned hydrolytic silane compound, and improving the storage stability of the ink.

For the purpose of solving the above-described problem, the present inventors have found that the water resisting property and the storage stability in a weak alkaline region of the ink can be improved by adding an organic or inorganic acid salt (in particular, ammonium salt) as an additive.

It has been found, however, that when the additive is added to the ink, agglomeration refractory or insoluble in water may be produced during the preparation of the ink.

Therefore, the present inventors have made earnest examinations, resulting in making a technical inference that the production of the agglomeration refractory or insoluble in water can be prevented by mixing a mixture of a dye and a water-soluble substance that is condensation-polymerized in the absence of water with an additive of at least one of an organic acid salt and an inorganic acid salt after adjusting pH of a solution including the mixture or a solution including the additive.

This technical inference has been specifically experimentally confirmed. As a result, it has been confirmed that the interaction between the dye and the water-soluble substance that is condensation-polymerized in the absence of water can be relaxed during the preparation of the ink according to this technical inference, namely, according to the present invention, so as to attain an effect to suppress the production of the agglomeration refractory or insoluble in water.

Specifically, the method of this invention for preparing an ink having constituents of a water-soluble dye having a water-soluble solubilizing group of at least one of a sulfonic group and a carboxyl group, water, a water-soluble substance that is condensation-polymerized in the absence of the water, a water-soluble medium and an additive including at least one of an organic acid salt and an inorganic acid salt, includes a first mixing step of mixing at least the dye and the water-soluble substance that is condensation-polymerized in the absence of the water out of the constituents of the ink excluding the additive; a second mixing step of mixing a mixture obtained in the first mixing step and the additive; and a pH adjusting step, performed before the second mixing step, of preparing a solution including the mixture or a solution including the additive while adjusting the solution to a given pH range by using a pH adjuster.

In other words, the solution including the mixture obtained in the first mixing step is prepared while adjusting the solution to the given pH range by using the pH adjuster in the pH adjusting step, and subsequently in the second mixing step, the solution including the mixture is mixed with the additive. Alternatively, the solution including the additive is prepared while adjusting the solution to the given pH range by using the pH adjuster in the pH adjusting step, and subsequently in the second mixing step, the solution including the additive is mixed with the mixture obtained in the first mixing step.

Thus, interaction between the dye and the water-soluble substance that is condensation-polymerized in the absence of water can be relaxed, so as to suppress production of agglomeration refractory or insoluble in water. As a result, no agglomeration is caused during the preparation of the ink, and hence, the ink can be efficiently prepared.

The water-soluble substance that is condensation-polymerized in the absence of the water is preferably a hydrolytic organic silicon compound or a partial hydrolysate thereof, or a hydrolytic organic silicon compound having an amino group or a partial hydrolysate thereof. Such a compound or hydrolysate is very preferably used from the viewpoint of improvement of the water resisting property of the ink.

Furthermore, the additive is preferably an ammonium salt having a cation of $NH_4^+$. Examples of the ammonium salt are ammonium chloride, ammonium sulfate, diammonium oxalate, ammonium acetate, ammonium dihydrogenphosphate, diammonium hydrogenphosphate, triammonium phosphate, ammonium carbonate and ammonium bicarbonate.

The water-soluble medium is alcohol, ester, ketone or glycol, which is an organic compound soluble in water, and is preferably polyalcohol such as glycerin, a water-soluble nitrogen heterocyclic compound such as 2-pyrollidone or N-methyl-2-pyrollidone, polyalcohol monoalkyl ether such as diethylene glycol monobutyl ether, or polyalcohol dialkyl ether such as diethylene glycol dimethyl ether.

Furthermore, the pH adjuster is preferably an alkaline substance, and more specifically, is preferably at least one selected from the group consisting of sodium hydrate, potassium hydrate, ammonia and organic amines, among which ammonia (or ammonia water) is suitably used. Also, the given pH range of the solution adjusted in the pH adjusting step is preferably a pH range of 8 to 11. Thus, the production of the agglomeration refractory or insoluble in water can be definitely suppressed.

When recording is performed by using an ink-jet recording apparatus using an ink-jet head loaded with an ink cartridge filled with the ink prepared by the aforementioned preparation method, ink drops jetted from nozzles of the ink-jet head are adhered onto a recording medium. Then, a moisture content (including an agglomeration stabilizing agent) of the ink is evaporated or is permeated into the recording medium, and the water-soluble substance is condensation-polymerized so that a resultant condensation polymerization reaction product can surround the dye. Also, ammonia is simultaneously volatilized from the additive, such as an ammonium salt, including the organic acid salt and/or inorganic acid salt and contained in the ink, so as to enhance the interaction between the dye and the condensation polymerization reaction product. In this manner, even when an image formed on the recording medium with the ink drops gets wet with water, the dye can be prevented from oozing out into the water, resulting in securing the water resisting property of the image.

DETAILED DESCRIPTION OF THE INVENTION

A preferred embodiment of the invention will now be described with reference to the accompanying drawings.

Figure 1:
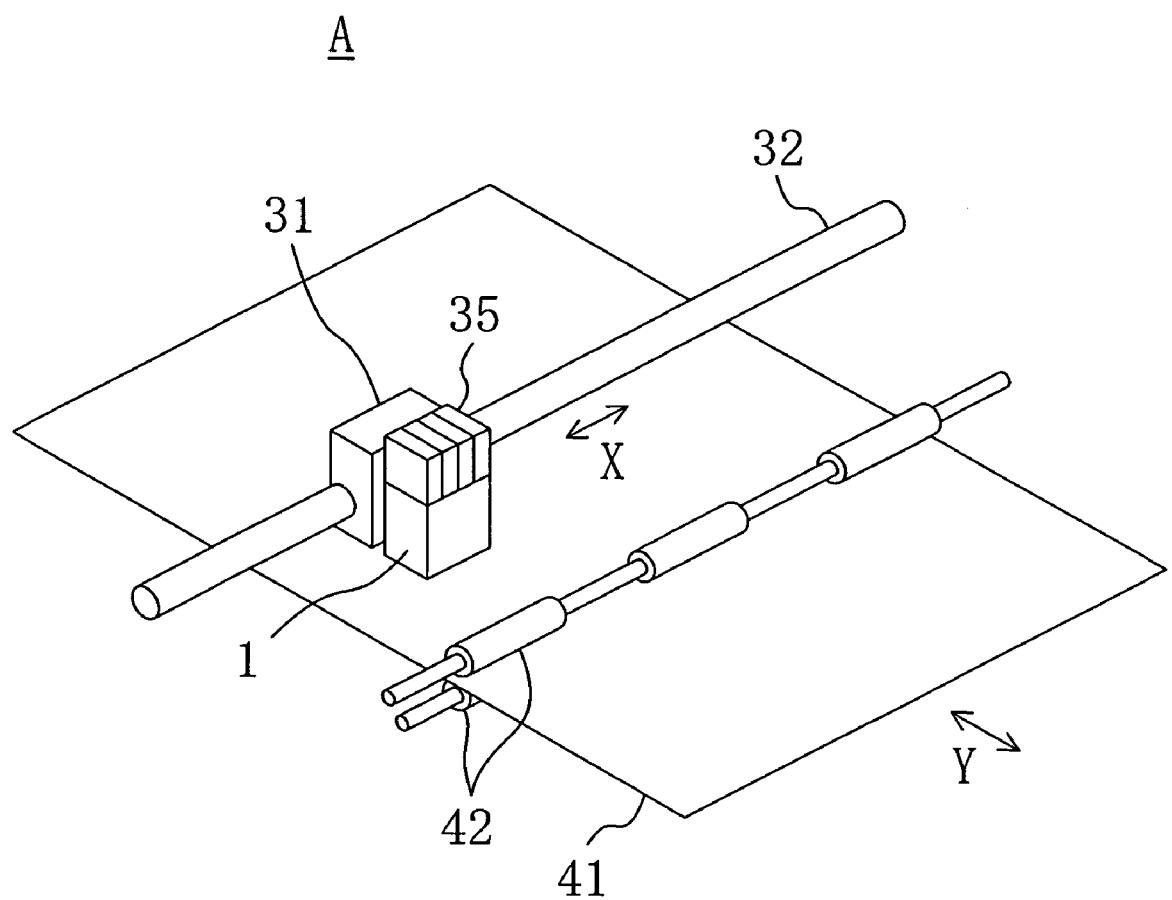
FIG. 1 is a schematic perspective view of an ink-jet recording apparatus using an ink according to an embodiment of the invention.

FIG. 1 schematically shows an ink-jet recording apparatus A equipped with an ink-jet recording ink according to the embodiment of the invention. The recording apparatus A includes an ink-jet head 1 that has, on an upper face thereof, an ink cartridge 35 having a cartridge body filled with the ink and jets the ink onto recording paper 41 serving as a recording medium as described later. The ink-jet head 1 is fixedly supported on a carriage 31. The carriage 31 is provided with a carriage motor not shown. The ink-jet head 1 and the carriage 31 are guided by a carriage axis 32 extending along a primary scanning direction (namely, a direction X in FIGS. 1 and 2) to be reciprocated along this direction by the carriage motor.

The recording paper 41 is sandwiched between two transfer rollers 42 driven to rotate by a transfer motor not shown. The recording paper 41 is transferred by the transfer motor and the transfer rollers 42 below the ink-jet head 1 in a secondary scanning direction (namely, a direction Y in FIGS. 1 and 2) perpendicular to the primary scanning direction. Thus, the transfer motor and the transfer rollers 42 together construct transferring means for transferring the recording paper 41.

Thus, the ink-jet head 1 is displaced relatively to the recording paper 41 by using the carriage 31, the carriage axis 32, the carriage motor, the transfer rollers 42 and the transfer motor.

Figure 2:
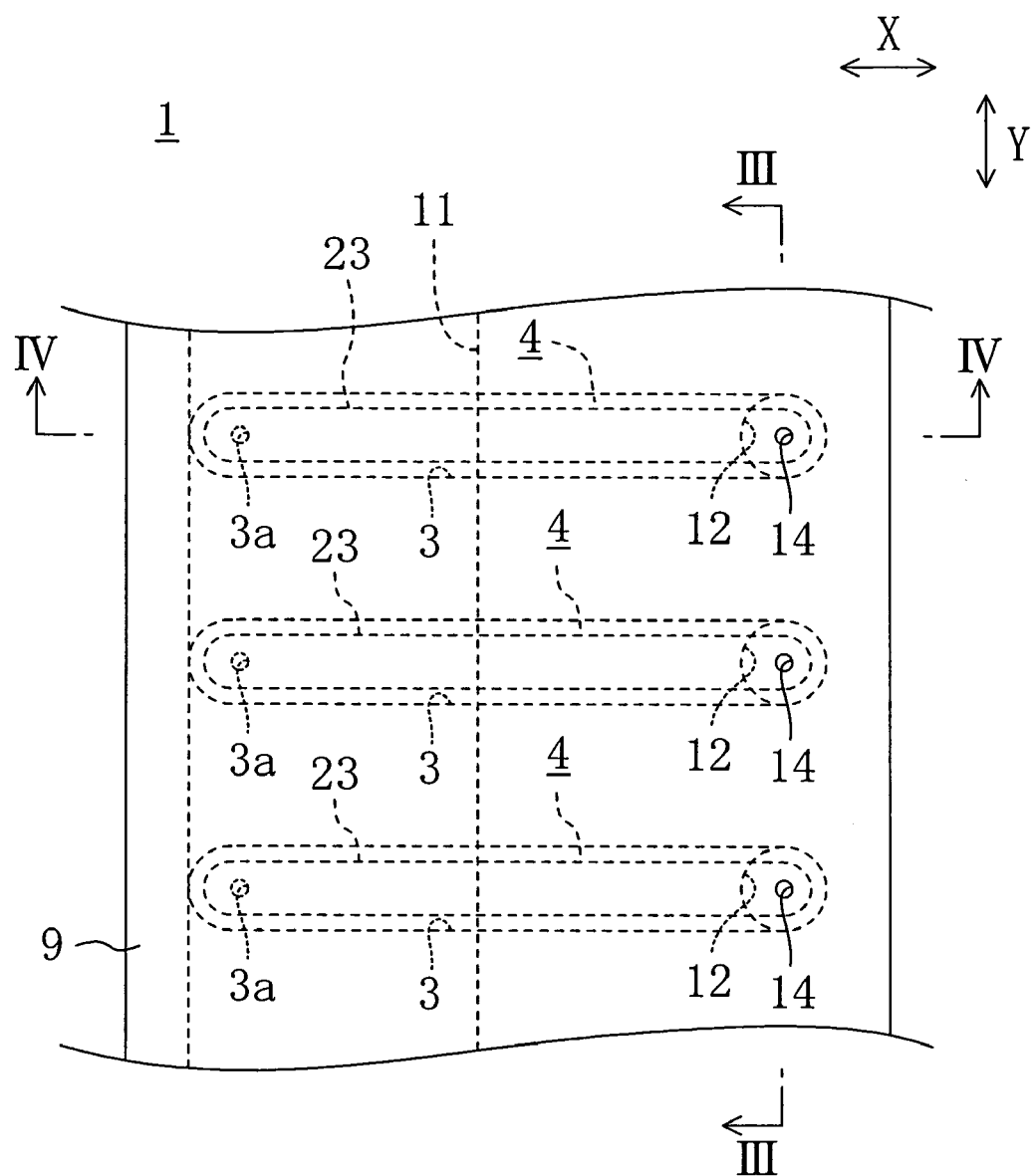
FIG. 2 is a partial bottom view of an ink-jet head of the ink-jet recording apparatus.
Figure 3:
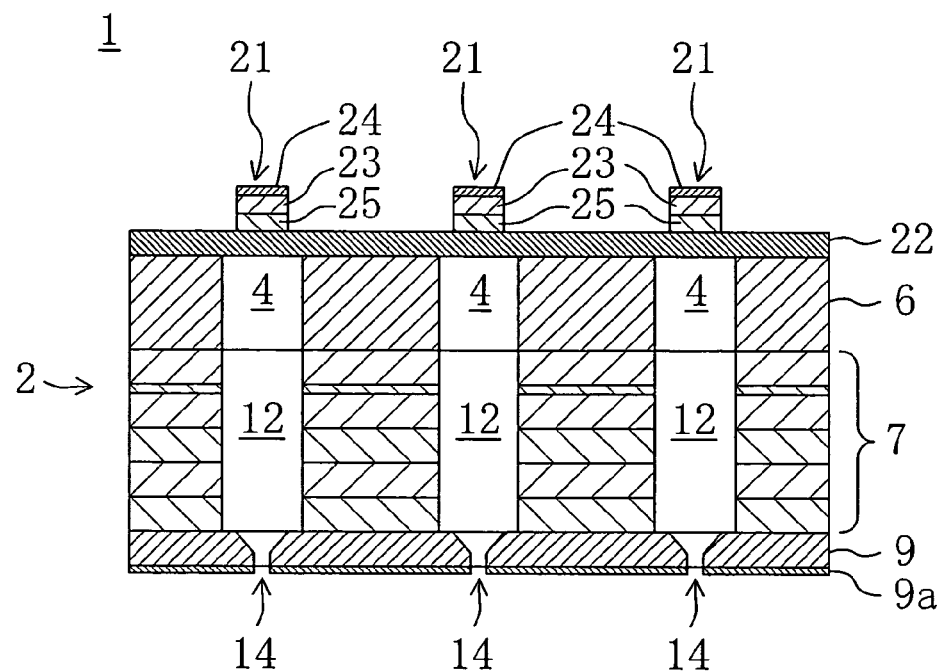
FIG. 3 is a cross-sectional view taken along line III-III of FIG. 2.
Figure 4:
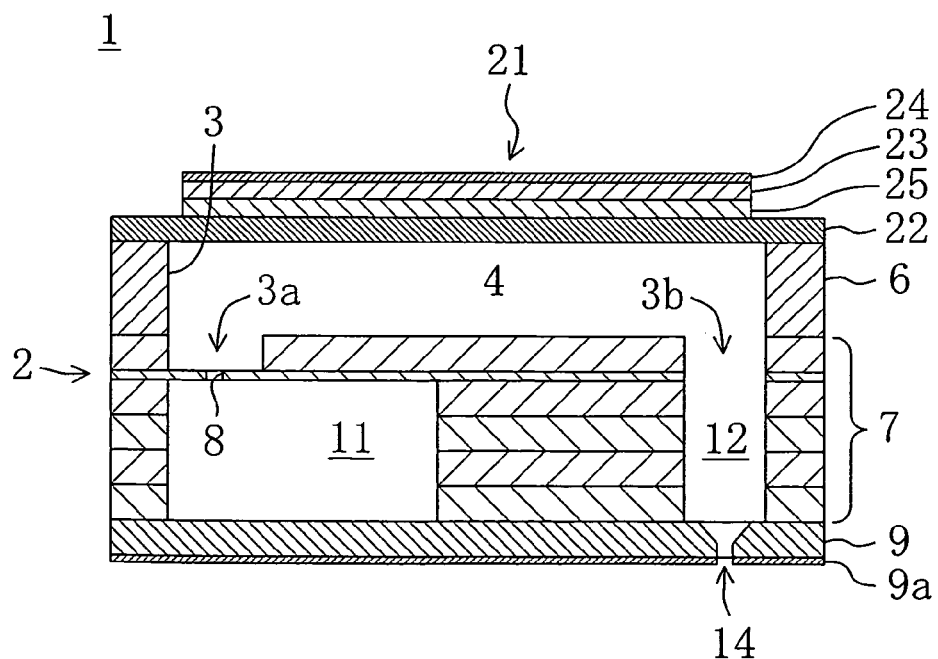
FIG. 4 is a cross-sectional view taken along line IV-IV of FIG. 2.

The ink-jet head 1 includes, as shown in FIGS. 2 through 4, a head body 2 that has a plurality of pressure chamber recesses 3 each having a supply port 3a for supplying the ink and a discharge port 3b for discharging the ink. The recesses 3 of the head body 2 are formed to be opened on the top face of the head body 2 so as to extend in the primary scanning direction at equal intervals therebetween along the secondary scanning direction. The opening of each recess 3 has a total length of approximately 1250 μm and a width of approximately 130 μm. Each end of the opening of the recess 3 is in a substantially semi-circular shape.

The side face of each recess 3 of the head body 2 is formed by a pressure chamber part 6 made of a photosensitive glass with a thickness of approximately 200 μm, and the bottom of the recess 3 is formed by an ink passage part 7 adhesively fixed on the lower face of the pressure chamber part 6 and composed of stacked six stainless steel thin plates. The supply ports 3a of the recesses 3, a plurality of orifices 8 respectively connected to the supply ports 3a, one ink supplying passage 11 connected to the orifices 8 and extending along the secondary scanning direction and a plurality of ink discharging passages 12 connected to the respectively discharge ports 3b are formed in the ink passage part 7.

Each orifice 8 is formed in the second stainless steel thin plate from the top having a smaller thickness than the other stainless steel thin plates, and has a diameter of approximately 38 μm. Furthermore, the ink supplying passage 11 is connected to the ink cartridge 35, so that the ink can be supplied to the ink supplying passage 11 from the ink cartridge 35.

A nozzle plate 9 made of a stainless steel plate having a plurality of nozzles 14 for jetting ink drops onto the recording paper 41 is adhesively fixed on the lower face of the ink passage part 7. The lower face of the nozzle plate 9 is covered with a water repellent film 9a. Each nozzle 14 is connected to each ink discharging passage 12 so as to communicate with the discharge port 3b of each recess 3 through the ink discharging passage 12, and the nozzles 14 are arranged in a line extending along the secondary scanning direction on the lower face of the ink-jet head 1. Each nozzle 14 has a taper section in which the diameter of the nozzle is reduced toward the tip thereof and a straight section continued from the end of the taper section closer to the tip of the nozzle. The straight section has a diameter of approximately 20 μm.

A piezoelectric actuator 21 is provided above each of the recesses 3 of the head body 2. The piezoelectric actuator 21 has a vibration plate 22 of Cr that is fixedly jointed to the top face of the head body 2 so as to cover each recess 3 of the head body 2 and to form a pressure chamber 4 together with the recess 3. One vibration plate 22 is shared by all the piezoelectric actuators 21 and also works as a common electrode shared by all piezoelectric devices 23 described later.

Each piezoelectric actuator 21 includes the piezoelectric device 23 of lead zirconate titanate (PZT) and an individual electrode 24 of Pt for applying a voltage (driving voltage) to the piezoelectric device 23 together with the vibration plate 22. The piezoelectric device 23 is provided on a face (top face) of the vibration plate 22 in a position opposite to the pressure chamber 4 in a portion corresponding to the pressure chamber 4 (namely, in a portion opposing the opening of the recess 3) with an intermediate layer 25 of Cu sandwiched therebetween. The individual electrode 24 is jointed onto a face of each piezoelectric device 23 opposite to the vibration plate 22 (namely, the upper face of the piezoelectric device 23).

The vibration plate 22, the piezoelectric devices 23, the individual electrodes 24 and the intermediate layers 25 are all made of thin films. The vibration plate 22 has a thickness of approximately 6 µm, each piezoelectric device 23 has a thickness of 8 µm or less (for example, approximately 3 µm), each individual electrode 24 has a thickness of approximately 0.2 µm, and each intermediate layer 25 has a thickness of approximately 3 Each piezoelectric actuator 21 deforms a portion of the vibration plate 22 corresponding to the pressure chamber 4 (namely, the portion corresponding to the opening of the recess 3) by applying the driving voltage to the corresponding piezoelectric device 23 via the vibration plate 22 and the corresponding individual electrode 24, whereby the ink contained in the pressure chamber 4 is discharged from the discharge port 3b and the nozzle 14. Specifically, when a pulse voltage is applied between the vibration plate 22 and the individual electrode 24, the piezoelectric device 23 shrinks owing to the piezoelectric effect in the width direction perpendicular to the thickness direction at the rise of the pulse voltage but the vibration plate 22, the individual electrode 24 and the intermediate layer 25 do not shrink. Therefore, the portion of the vibration plate 22 corresponding to the pressure chamber 4 is deformed into a convex shape protruding toward the pressure chamber 4 through what is called a bimetal effect. This deformation increases the pressure within the pressure chamber 4, and the increased pressure pushes out the ink contained in the pressure chamber 4 through the discharge port 3b and the ink discharging passage 12 from the nozzle 14. Then, the piezoelectric device 23 expands at the fall of the pulse voltage and the portion of the vibration plate 22 corresponding to the pressure chamber 4 is restored in its shape. At this point, the ink pushed out from the nozzle 14 is pulled off from the ink remaining in the ink discharging passage 12 and jetted onto the recording paper 41 as ink drops (for example, 3 pl), so as to adhere onto the recording paper 41 in the form of dots. Also, when the vibration plate 22 restores from the deformed convex shape to the original shape, the ink is charged in the pressure chamber 4 from the ink cartridge 35 through the ink supplying passage 11 and the supply port 3a. The pulse voltage to be applied to each piezoelectric device 23 is not limited to the aforementioned push-pull type pulse voltage but may be a pull-push type pulse voltage that falls from a first voltage to a second voltage lower than the first voltage and then rises to the first voltage.

The application of the driving voltage to the respective piezoelectric devices 23 is performed at predetermined time intervals (for example, every approximately 50 µs; with a driving frequency of 20 kHz) while the ink-jet head 1 and the carriage 31 are moved in the primary scanning direction from one end to the other end of the recording paper 41 at a substantially constant speed. (However, when the ink-jet head 1 reaches a portion of the recording paper 41 where no ink drops are to be adhered, the voltage is not applied.) Thus, ink drops are made to impact on desired portions of the recording paper 41. When a recording operation for one scanning is completed, the recording paper 41 is transferred in the secondary scanning direction by a given amount by the transfer motor and the transfer rollers 42. Thereafter, ink drops are jetted while moving the ink-jet head 1 and the carriage 31 in the primary scanning direction again for a recording operation for another scanning. Such operations are repeated, so as to form a desired image on the whole recording paper 41.

The ink used in the aforementioned recording apparatus A includes a water-soluble dye having a water-soluble solubilizing group of at least one of a sulfonic group and a carboxyl group; water; a water-soluble substance that is condensation-polymerized in the absence of water; a water-soluble medium; and an additive of at least one of an organic acid salt and an inorganic acid salt.

The water-soluble substance that is condensation-polymerized in the absence of water is condensation-polymerized on the recording paper 41 when a moisture content of the ink is evaporated or is permeated into the recording paper after the ink drops jetted from the nozzles 14 of the ink-jet head 1 are adhered onto the recording paper 41. Thus, the water-soluble substance surrounds the dye. Therefore, even when an image formed on the recording paper 41 gets wet with water, the dye can be prevented from oozing out into the water, so that the water resisting property of the image can be improved. This water-soluble substance is preferably a hydrolytic organic silicon compound (i.e., a hydrolytic silane compound) or a partial hydrolysate of such a compound, or a hydrolytic organic silicon compound having an amino group (i.e., a hydrolytic amino silane compound) or a partial hydrolysate of such a compound.

Preferable examples of the organic silicon compound are a reaction product of hydrolysis of alkoxysilane including an organic group having an amino group and alkoxysilane having no amino group; and an organic silicon compound obtained through hydrolysis of hydrolytic silane having no nitrogen atom and hydrolytic silane resulting from a reaction between hydrolytic silane having an amino group and an organic monoepoxy compound.

The water-soluble medium is alcohol, ester, ketone or glycol, which is an organic compound soluble in water, and preferable examples are polyalcohol such as glycerin, a water-soluble nitrogen heterocyclic compound such as 2-pyrollidone or N-methyl-2-pyrollidone, polyalcohol monoalkyl ether such as diethylene glycol monobutyl ether, and polyalcohol dialkyl ether such as diethylene glycol dimethyl ether.

Furthermore, the additive is preferably an ammonium salt having $NH_4^+$ as a cation. Specific examples of the ammonium salt are ammonium chloride, ammonium sulfate, diammonium oxalate, ammonium acetate, ammonium dihydrogenphosphate, diammonium hydrogenphosphate, triammonium phosphate, ammonium carbonate and ammonium bicarbonate.

Now, two methods (first and second preparation methods) for preparing the ink will be described.

In the first preparation method, the dye and the water-soluble substance that is condensation-polymerized in the absence of water are mixed in a reaction vessel (which corresponds to a first mixing step). The water and the water-soluble medium may not be mixed in this step, or a part or whole of the necessary contents of the water and the water-soluble medium may be mixed in this step. In the case where a part or none is mixed in this step, the water and the water-soluble medium are appropriately mixed in the following steps so as to ultimately attain the necessary contents (which applies to the second preparation method described later).

Thereafter, a solution including the mixture obtained in the first mixing step is adjusted to a given pH range by using a pH adjuster (which corresponds to a pH adjusting step). The pH adjuster may be any alkaline substance, and more specifically, is preferably at least one selected from the group consisting of sodium hydrate, potassium hydrate, ammonia and organic amines, among which ammonia (or ammonia water) is suitably used. By using such a pH adjuster, the solution including the mixture is preferably adjusted to a pH range of 8 to 11 (and more preferably to a pH range of 9 to 10).

Subsequently, the additive such as an ammonium salt is mixed with the mixture by adding the additive to the solution including the mixture (which corresponds to a second mixing step). Thus, the ink is completed.

In the second preparation method, the additive is first placed in a reaction vessel, and a solution including the additive is adjusted to a given pH range by using a pH adjuster similar to that used in the first preparation method (which corresponds to the pH adjusting step). Also in this method, the given pH range is preferably a pH range of 8 to 11 (and more preferably a pH range of 9 to 10) as in the first preparation method. In this second preparation method, a part of the water of the necessary content is preferably placed in the reaction vessel together with the additive in the pH adjusting step.

On the other hand, in the same manner as in the first preparation method, the dye and the water-soluble substance that is condensation-polymerized in the absence of water are mixed in another reaction vessel (which corresponds to the first mixing step). This step may be carried out before or after the pH adjusting step.

Subsequently, the solution including the additive and the mixture obtained in the first mixing step are mixed (which corresponds to the second mixing step). Thus, the ink is completed.

In conclusion, any of the first and second preparation methods includes, before the second mixing step, the pH adjusting step of adjusting, by using the pH adjuster, the solution including the mixture of the dye and the water-soluble substance that is condensation-polymerized in the absence of water or the solution including the additive to the given pH range. When the ink is prepared in this manner, the interaction between the dye and the water-soluble substance that is condensation-polymerized in the absence of water can be relaxed, so that production of agglomeration refractory or insoluble in water can be suppressed in the respective steps. As a result, when a solid material is filtered off with a filter, the filtration can be smoothly carried out. Also, a water resistant ink having storage stability for a long period of time can be prepared by thus adjusting the pH.

On the other hand, when the ink is prepared by a method other than the first and second preparation methods, agglomeration refractory or insoluble in water is produced. For example, in the case where hydrolytic silane having an amino group or a partial hydrolysate thereof serving as the water-soluble substance that is condensation-polymerized in the absence of water is first mixed with an ammonium salt serving as the additive, ammonia is rapidly volatilized to lower pH. When the dye is added thereto, the interaction between the dye and the amino silane compound is too strong to produce the agglomeration.

Next, specifically practiced examples will be described.

As described in detail below, an ink according to Example 1 was prepared in the same manner as in the first preparation method described in the above-described embodiment, and an ink according to Example 2 was prepared in the same manner as in the second preparation method. Furthermore, inks according to Comparative Examples 1 and 2 were prepared for comparison by different preparation methods.

In each of Examples 1 and 2 and Comparative Examples 1 and 2, an acid dye "Acid Red 289" was used as the dye. Also, glycerin and diethylene glycol monobutyl ether were used as the water-soluble medium. Furthermore, an organic silicon compound was used as the water-soluble substance that is condensation-polymerized in the absence of water. Moreover, diammonium hydrogenphosphate was used as the additive.

The organic silicon compound was obtained by synthesizing 0.2 mol of $H_2NCH_2CH_2HNCH_2CH_2CH_2Si(OCH_3)_3$ and 0.1 mol of $Si(OCH_3)_4$ by a method disclosed in Japanese Laid-Open Patent Publication No. 10-212439.

EXAMPLE 1

First, 3 parts by weight of the dye, 5 parts by weight of the organic silicon compound, 10 parts by weight of the glycerin, 10 parts by weight of the diethylene glycol monobutyl ether and 69 parts by weight of water were placed in a reaction vessel and mixed with stirring (as the first mixing step).

Thereafter, ammonia water (serving as a pH adjuster) was added to the resultant mixture obtained in the first mixing step so as to prepare a solution including the mixture. At this point, the solution is adjusted by using the ammonia water to a pH range of 9 to 10 (as the pH adjusting step).

Subsequently, 3 parts by weight of the additive was added to the solution including the mixture, so as to mix the mixture with the additive (as the second mixing step). Thus, the ink according to Example 1 was completed.

EXAMPLE 2

After placing 3 parts by weight of the additive and 30 parts by weight of water in a reaction vessel, the resultant was stirred. Ammonia water was added to the resultant solution, so that the solution including the additive could be adjusted to a pH range of 9 to 10 (as the pH adjusting step).

On the other hand, 3 parts by weight of the dye, 5 parts by weight of the organic silicon compound, 10 parts by weight of the glycerin, 10 parts by weight of the diethylene glycol monobutyl ether and 39 parts by weight of water were placed in another reaction vessel and mixed with stirring (as the first mixing step).

Subsequently, the solution including the additive and the mixture obtained in the first mixing step were mixed (as the second mixing step). Thus, the ink according to Example 2 was completed.

COMPARATIVE EXAMPLE 1

In the same manner as in Example 1, 3 parts by weight of the dye, 5 parts by weight of the organic silicon compound, 10 parts by weight of the glycerin, 10 parts by weight of the diethylene glycol monobutyl ether and 69 parts by weight of water were placed in a reaction vessel and mixed with stirring. Thereafter, differently from Example 1, 3 parts by weight of the additive was added to the resultant mixture without performing the pH adjusting step. Subsequently, the solution contained in the reaction vessel was adjusted by using ammonia water to a pH range of 9 to 10. Thus, the ink according to Comparative Example 1 was completed.

COMPARATIVE EXAMPLE 2

After 5 parts by weight of the organic silicon compound and 30 parts by weight of water were placed in a reaction vessel, 3 parts by weight of the additive was added thereto, and the resultant was mixed with stirring. Subsequently, 3 parts by weight of the dye, 10 parts by weight of the glycerin, 10 parts by weight of the diethylene glycol monobutyl ether and 39 parts by weight of water were placed in the reaction vessel. Thereafter, the resultant solution contained in the reaction vessel was adjusted by using ammonia water to a pH range of 9 to 10. Thus, the ink according to Comparative Example 2 was completed.

Each of the inks of Examples 1 and 2 and Comparative Examples 1 and 2 was checked for production of agglomeration. This check for the agglomeration was performed as follows: First, the production of the agglomeration in the ink was visually checked. If it was necessary to check in more detail, the ink was allowed to pass through a filter with a pore size of 0.45 μm for checking the production of the agglomeration. The results of this check are listed in Table 1 below.

TABLE 1

| | Production of agglomeration | | Storage stability | Water resisting property |
|---|---|---|---|---|
| | Visual check | Filter check | test | test |
| Example 1 | Non | Non | No agglomeration | No bleeding |
| Example 2 | Non | Non | No agglomeration | No bleeding |
| Comparative Example 1 | Slightly produced (after adding additive) | Produced | — | — |
| Comparative Example 2 | Produced (after adding dye) | Produced | — | — |

It is understood from these results that the agglomeration was visually found to be produced in each of the inks of Comparative Examples 1 and 2 during the preparation (i.e., after adding the additive in Comparative Example 1 and after adding the dye in Comparative Example 2). In contrast, no agglomeration was found visually and by using the filter in each of the inks of Examples 1 and 2 during and after the preparation.

Next, each of the inks of Examples 1 and 2 and Comparative Examples 1 and 2 was subjected to a storage stability test. In the storage stability test, each ink was filled and sealed in a screw tube bottle and allowed to stand at 70° C. for 500 hours. Then, production of agglomeration in the ink was first visually checked. If it was necessary to check in more detail, the ink was allowed to pass through a filter with a pore size of 0.45 μm so as to check the production of the agglomeration.

The results of this storage stability test are also listed in Table 1. It is noted that a symbol "—" used in Table 1 means that the test could not be performed. Specifically, since the agglomeration had been produced in the inks of Comparative Examples 1 and 2 during the preparation, these inks could not be subjected to the storage stability test (which applies to a water resisting property test below).

It is understood from these results that no agglomeration was found visually and by using the filter in each of the inks of Examples 1 and 2.

Next, each of the inks of Examples 1 and 2 and Comparative Examples 1 and 2 was subjected to the water resisting property test. In the water resisting property test, each ink was used to form an image on ordinary paper (Brand Name: Xerox4024 manufactured by Xerox) by using a commercially available printer (using, for jetting the ink, a piezoelectric actuator that is similar to that described in the aforementioned embodiment but has a rather larger thickness than that described in the embodiment). The paper on which the image had been thus formed was dipped in pure water, and the resultant paper was dried by allowing it to stand at room temperature, so as to check whether or not bleeding was caused in the image.

The results of the water resisting property test are also listed in Table 1. It is understood from the results that no bleeding is caused in the images formed by using the inks of Examples 1 and 2, which means these inks have a satisfactory water resisting property.

Although not described as specific examples, it was also confirmed that each ink that uses another dye (a water-soluble dye (acid dye or direct dye) having a water-soluble solubilizing group of at least one of a sulfonic group and a carboxyl group) instead of the above-described dye (Acid Red 289) used in Examples 1 and 2 could attain a similar result to those obtained by Examples 1 and 2.

Accordingly, in the preparation of an ink including a water-soluble dye having a water-soluble solubilizing group of at least one of a sulfonic group and a carboxyl group, water, a water-soluble substance that is condensation-polymerized in the absence of the water, a water-soluble medium and an additive including at least one of an organic acid salt and an inorganic acid salt, before mixing a mixture of the dye and the water-soluble substance that is condensation-polymerized in the absence of the water with the additive, a solution including the mixture or a solution including the additive is adjusted in pH. In this manner, the interaction between the dye and the water-soluble substance that is condensation-polymerized in the absence of the water can be relaxed, so that production of agglomeration refractory or insoluble in water can be suppressed during or after the preparation. Therefore, the ink can be efficiently prepared. Also, the ink prepared by such a method can be improved in its storage stability while keeping its water resisting property.

What is claimed is:

1. A method for preparing an ink having constituents of a water-soluble dye having a water-soluble solubilizing group of at least one selected from the group consisting of a sulfonic group and a carboxyl group, water, a water-soluble substance that is condensation-polymerized in the absence of said water, a water-soluble medium and an additive including at least one selected from the group consisting of an organic acid salt and an inorganic acid salt, comprising:

a first mixing step of mixing at least said dye and said water-soluble substance that is condensation-polymerized in the absence of said water out of said constituents of said ink excluding said additive;

a pH adjusting step of preparing a solution including a mixture obtained in the first mixing step while adjusting said solution to a given pH range by using a pH adjuster; and a second mixing step, performed after the pH adjusting step, of mixing said solution including said mixture and said additive, wherein a cation of said additive is $NH_4^+$, and wherein the given pH range of said solution adjusted in the pH adjusting step is a pH range of 8 to 11.

2. The method for preparing an ink of claim 1, wherein said water-soluble substance that is condensation-polymerized in the absence of said water is a hydrolytic organic silicon compound or a partial hydrolysate thereof.

3. The method for preparing an ink of claim 1, wherein said water-soluble substance that is condensation-polymerized in the absence of said water is a hydrolytic organic silicon compound having an amino group or a partial hydrolysate thereof.

4. The method of claim 1, wherein said pH adjuster is an alkaline substance.

5. The method for preparing an ink of claim 4, wherein said alkaline substance is at least one selected from the group consisting of sodium hydrate, potassium hydrate, ammonia and organic amines.

6. A method for preparing an ink having constituents of a water-soluble dye having a water-soluble solubilizing group of at least one selected from the group consisting of a sulfonic group and a carboxyl group, water, a water-soluble substance that is condensation-polymerized in the absence of said water, a water-soluble medium and an additive including at least one selected from the group consisting of an organic acid salt and an inorganic acid salt, comprising:

a first mixing step of mixing at least said dye and said water-soluble substance that is condensation-polymerized in the absence of said water out of said constituents of said ink excluding said additive;

a pH adjusting step of preparing a solution including said additive while adjusting said solution to a given pH range by using a pH adjuster; and a second mixing step, performed after said pH adjusting step, of mixing said solution including said additive and a mixture obtained in the first mixing step, wherein a cation of said additive is $NH_4^+$, and wherein the given pH range of said solution adjusted in the pH adjusting step is a pH range of 8 to 11.

7. The method for preparing an ink of claim 6, wherein said water-soluble substance that is condensation-polymerized in the absence of said water is a hydrolytic organic silicon compound or a partial hydrolysate thereof.

8. The method for preparing an ink of claim 6, wherein said water-soluble substance that is condensation-polymerized in the absence of said water is a hydrolytic organic silicon compound having an amino group or a partial hydrolysate thereof.

9. The method for preparing an ink of claim 6, wherein said pH adjuster is an alkaline substance.

10. The method for preparing an ink of claim 9, wherein said alkaline substance is at least one selected from the group consisting of sodium hydrate, potassium hydrate, ammonia and organic amines.

* * * * *